United States Patent
Hoff et al.

(10) Patent No.: US 7,092,848 B2
(45) Date of Patent: Aug. 15, 2006

(54) CONTROL SYSTEM HEALTH TEST SYSTEM AND METHOD

(75) Inventors: Brian D. Hoff, East Peoria, IL (US); Kris W. Johnson, Washington, IL (US); Sivaprasad Akasam, Peoria, IL (US); Thomas M. Baker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 143 days.

(21) Appl. No.: 10/740,455

(22) Filed: Dec. 22, 2003

(65) Prior Publication Data

US 2005/0134284 A1    Jun. 23, 2005

(51) Int. Cl.
G06F 11/30 (2006.01)
G01M 17/00 (2006.01)
G05B 13/02 (2006.01)

(52) U.S. Cl. .......................... 702/183; 701/29; 700/32
(58) Field of Classification Search ................ 702/183; 701/29; 700/32
See application file for complete search history.

(56) References Cited

U.S. PATENT DOCUMENTS

| | | | |
|---|---|---|---|
| 3,870,953 A | 3/1975 | Boatman et al. | |
| 4,280,285 A | 7/1981 | Haas | |
| 4,399,400 A | 8/1983 | Rockwell et al. | |
| 4,439,858 A | 3/1984 | Petersen | |
| RE31,828 E | 2/1985 | Raymond et al. | |
| 4,500,993 A | 2/1985 | Jacobson | |
| 4,542,335 A | 9/1985 | Williams | |
| 4,823,078 A | 4/1989 | Mohebban | |
| 4,924,177 A | 5/1990 | Mulz | |
| 5,083,299 A | 1/1992 | Schwanke et al. | |
| 5,233,512 A | 8/1993 | Gutz et al. | |
| 5,266,902 A | 11/1993 | Kovacich et al. | |
| 5,302,904 A | 4/1994 | Nopper | |
| 5,414,715 A | 5/1995 | Hamblin et al. | |
| 5,481,906 A | 1/1996 | Nagayoshi et al. | |
| 5,491,631 A | 2/1996 | Shirane et al. | |
| 5,517,426 A | 5/1996 | Underwood | |
| 5,594,646 A | 1/1997 | Itoh et al. | |
| 5,598,098 A | 1/1997 | Champlin | |
| 6,006,146 A | 12/1999 | Usui et al. | |
| 6,112,150 A | 8/2000 | Irons et al. | |
| 6,434,512 B1 * | 8/2002 | Discenzo | 702/184 |
| 6,587,767 B1 | 7/2003 | Letang et al. | |
| 6,615,160 B1 | 9/2003 | Quinnett et al. | |
| 6,633,782 B1 * | 10/2003 | Schleiss et al. | 700/26 |
| 6,687,653 B1 * | 2/2004 | Kurien et al. | 702/183 |
| 6,738,756 B1 * | 5/2004 | Brown et al. | 707/2 |
| 6,941,202 B1 * | 9/2005 | Wilson et al. | 701/29 |

* cited by examiner

*Primary Examiner*—Anjan Deb
*Assistant Examiner*—Jeff Natalini
(74) *Attorney, Agent, or Firm*—Finnegan, Henderson, Farabow, Garrett & Dunner LLP

(57) ABSTRACT

A method is provided for testing multiple elements of a work machine, including a control system, a component, a sub-component that is influenced by operations of the component, and a sensor that monitors a characteristic of the sub-component. In one embodiment, the method is performed by the control system and includes sending a command to the component to adjust a first parameter associated with an operation of the component. Also, the method includes detecting a sensor signal from the sensor reflecting a second parameter associated with a characteristic of the sub-component and determining whether the second parameter is acceptable based on the command. The control system may diagnose at least one of the elements of the work machine when the second parameter of the sub-component is not acceptable.

29 Claims, 6 Drawing Sheets

CONTROL SYSTEM HEALTH TEST SYSTEM AND METHOD

U.S. GOVERNMENT RIGHTS

This invention was made with government support under the terms of Contract No. DE-FC04-2000AL67017 awarded by the Department of Energy. The government may have certain rights in this invention.

TECHNICAL FIELD

This invention relates generally to diagnostic systems and more particularly, to systems and methods for diagnosing one or more elements of a work machine.

BACKGROUND

An important feature in modern work machines (e.g., fixed and mobile commercial machines, such as construction machines, fixed engine systems, marine-based machines, etc.) is the detection and diagnosis of faults or errors. Machine faults are not only annoying to their operators, but they also are costly to business entities that use the machines in their particular commercial industry. Accordingly, systems have evolved to help machines monitor and detect faults during their operations.

One such system is described in U.S. Pat. No. 5,481,906 ("the '906 patent"), which uses an apparatus to diagnose faults in an electronic component mounted in a vehicle. The apparatus analyzes sensor signals to determine whether a fault occurred in a particular component of the vehicle. Based on the analysis, the apparatus identifies a sensor that is associated with the fault and based on this identification, adjusts the operation of the vehicle's transmission or engine. Further, the apparatus notifies the operator of the vehicle of the identified fault. Although the apparatus described in the '906 patent allows a vehicle to detect and diagnose a fault, it is limited to detecting faults associated with particular sensors. The apparatus does not test multiple components of a vehicle during operation and cannot detect faults that may be attributed to components that are not associated with a sensor signal that identifies a fault in a different component.

Another vehicle fault diagnosis system is described in U.S. Pat. No. 5,594,646 ("the '646 patent"). This system uses self-check procedures to test the functionality of Electronic Control Units ("ECUs") embedded in a vehicle. According to certain embodiments, the diagnosis system in the '646 patent enables multiple subsidiary ECUs to perform self checking procedures to detect a malfunction. When a malfunction is detected, the subsidiary ECUs provide a corresponding signal to a main ECU, where information corresponding to the detected malfunction is stored. Although the '646 patent describes a system that allows a vehicle to perform self testing procedures, the system is limited to ECU malfunctions and cannot detect or diagnose faults associated with components not affiliated with one or more sensors monitoring the operation of different components.

Methods, systems, and articles of manufacture consistent with certain embodiments of the present invention are directed to solving one or more of the problems set forth above.

SUMMARY OF THE INVENTION

A method is provided for testing multiple elements of a work machine, including a control system, a component, a sub-component that is influenced by operations of the component, and a sensor that monitors a characteristic of the sub-component. In one embodiment, the method is performed by the control system and includes sending a command to the component to adjust a first parameter associated with an operation of the component. Also, the method includes detecting a sensor signal from the sensor reflecting a second parameter associated with a characteristic of the sub-component and determining whether the second parameter is acceptable based on the command. The control system may diagnose at least one of the elements of the work machine when the second parameter of the sub-component is not acceptable.

In another embodiment, a system is provided for diagnosing one or more elements of a work machine during operation of the work machine. The system may include a control system within the work machine that is configured to provide a command on a data link and evaluate an operation of at least one element in the work machine based on the command. Further, the system may include a component configured to perform a first operation for the work machine, receive the command, and adjust a first parameter associated with the first operation based on the command. Also, the system includes a sub-component configured to perform a second operation for the work machine and to adjust a second parameter associated with the second operation based on the first operation of the component. In this embodiment, the control system may receive a signal having a second parameter data value associated with the second parameter. The control system uses the data value to determine whether the second operation is being performed at an acceptable level.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Figure 1:
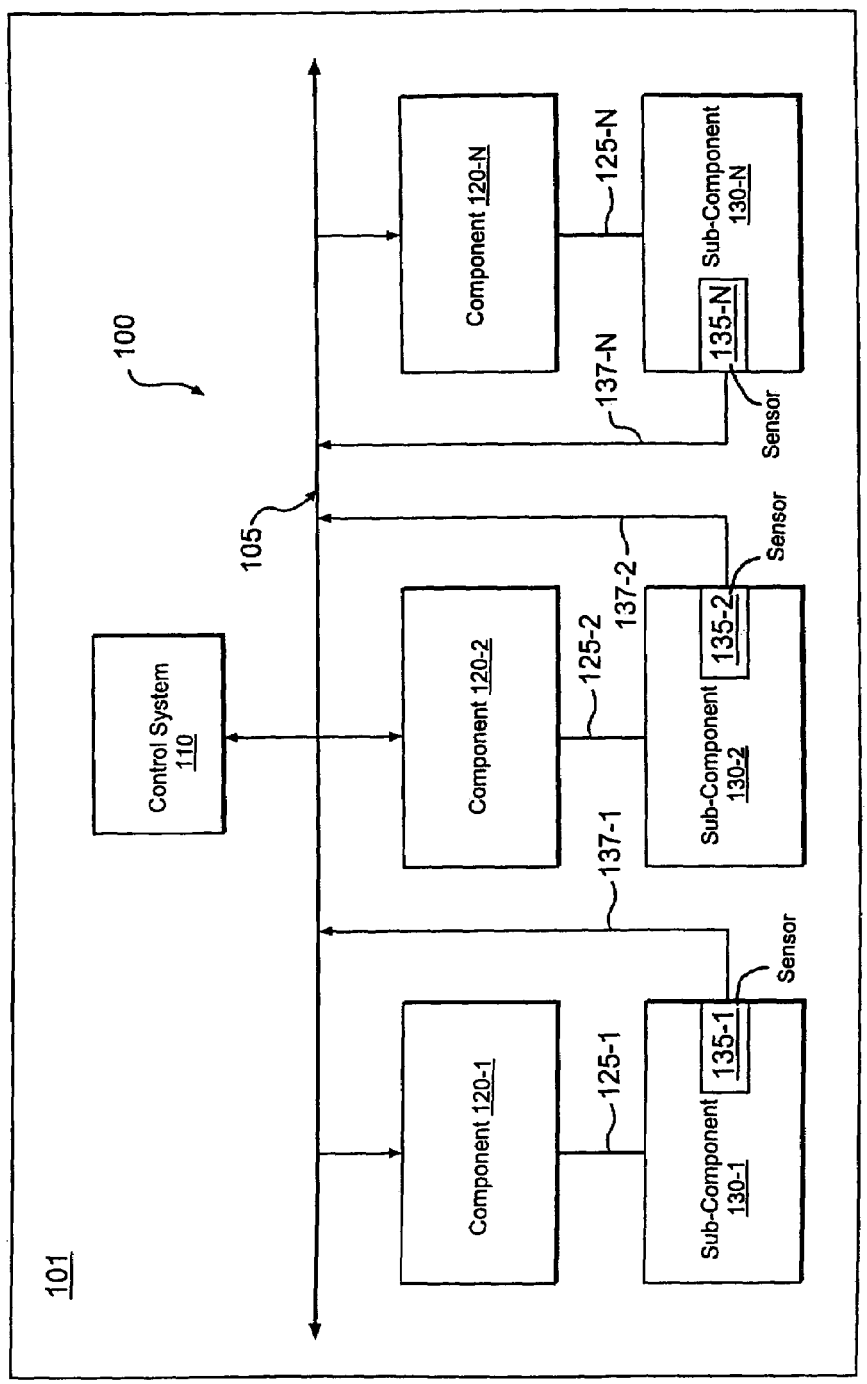
FIG. 1 illustrates a block diagram of an exemplary system that may be configured to perform certain functions consistent with embodiments of the present invention.

FIG. 1 illustrates a block diagram of an exemplary system 100 that may be configured to perform certain functions consistent with embodiments of the present invention. System 100 may be a system that is included in a work machine 101. As used herein, the term "work machine" refers to a fixed or mobile machine that performs at least one operation associated with a particular industry, such as mining, construction, farming, etc. and operates between or within work environments (e.g., construction site, mine site, power plant, etc.). The term "work machine" also encompasses fixed and/or mobile machines for use in non-industrial settings (e.g., machines for personal use). For example, a work machine may represent commercial machines, such as trucks, cranes, earth moving vehicles, mining vehicles, backhoes, material handling equipment, farming equipment, marine vessels, aircraft, and other types of machines that operate in a commercial or industrial environment. In addition, a work machine may represent an industrial fixed machine, such as an engine-based system operating on an off-shore drilling platform. Further, a work machine may also represent passenger automobiles, fishing boats, yachts, etc.

As shown, system 100 includes an on-board data link 105, a control system 110, one or more components 120-1 to 120-N, and one or more sub-components 130-1 to 130-N. Each subcomponent 130-1 to 130-N may also include one or more sensors 135-1 to 135-N, respectively.

On-board data link 105 represents one or more proprietary and/or non-proprietary data links that interconnect modules included in work machine 101. In one embodiment of the present invention, data link 105 may represent Society of Automotive Engineers (SAE) J1939, Controller Area Network (CAN), etc. standard data links.

Control system 110 represents one or more systems, devices, and/or mechanisms configured to perform certain control functions for work machine 101 and/or components of work machine 101. Control system 110 may be implemented by one or more hardware, software, and or firmware components. In certain embodiments, control system 110 may be an Engine Control Module (ECM) embedded in work machine 110, although other forms of control modules may be implemented.

Components 120-1 to 120-N represent one or more systems that control and/or influence the operation of one or more respective sub-components 130-1 to 130-N. In one embodiment, components 120-1 to 120-N each include a control unit that controls a drive system based on data received from control system 110. The drive system may provide power to control the operation of a respective sub-component 130-1 to 130-N. For example, one or more of components 120-1 to 120-N may include a controller that adjusts the operation of a device (e.g., motor) that transfers power to a corresponding sub-component, such as an oil, hydraulic fluid, or coolant pump drive system. Components 120-1 to 120-N may include one or more shafts or other types of mechanisms 125-1 to 125-N that are connected to a motor for transferring power from the motor to a respective sub-component 130-1 to 130-N.

Sub-components 130-1 to 130-N represent one or more operational systems that perform a certain type of operation or functionality for work machine 101. In one embodiment, one or more of sub-components 130-1 to 130-N include pump systems that are driven by a motor included in a corresponding component 120-1 to 120-N.

In one embodiment, each sub-component 130-1 to 130-N may include one or more sensors 135-1 to 135-N that monitor one or more parameters or characteristics of a corresponding sub-component. Sensors 135-1 to 135-N may be similar or different types of sensors based on the type of affiliated sub-component 130-1 to 130-N. For example, sensors 135-1 to 135-N may be one or more of motion sensors, magnetic switches, pressure switches, alarms, speed sensors, distance sensors, throttle position sensors, pressure sensors, voltage sensors, temperature sensors, ignition reference sensors, speed control switches, fuel injector sensors, etc. Sensors 135-1 to 135-N generate signals 137-1 to 137-N that represent the monitored characteristics of each respective sub-component 130-1 to 130-N. Signals 137-1 to 137-N may be sent to control system 110 through data link 105. Alternatively, or additionally, signals 137-1 to 137-N may be sent directly to control system 110 through a dedicated sensor input interface (not shown) included in control system 110.

Figure 2:
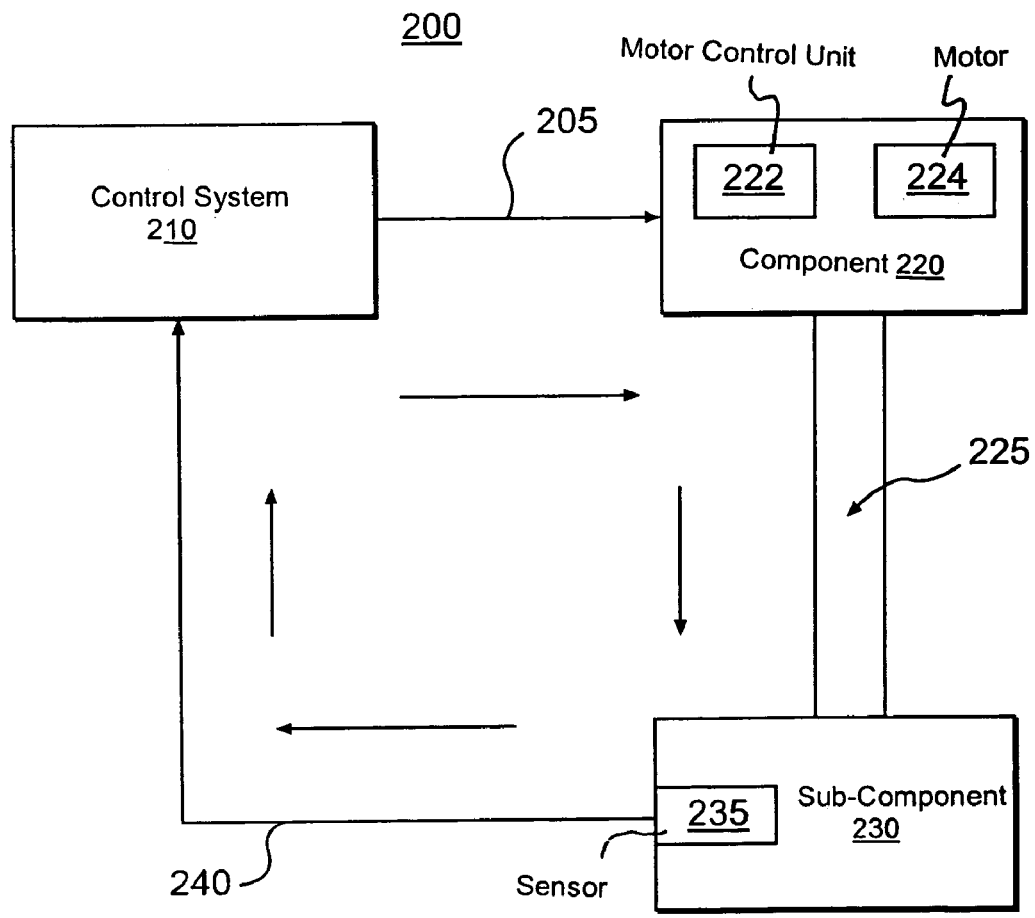
FIG. 2 illustrates a block diagram of an exemplary closed loop system consistent with embodiments of the present invention.

In certain embodiments, control system 110 sends one or more commands to one or more components 120-1 to 120-N for controlling the operation of sub-component 120-1 to 120-N. For example, control system 110 may send a command to component 120-1 to adjust the operation of a mechanism that provides power to sub-component 130-1. Methods and systems consistent with embodiments of the present invention leverage these features of system 100 to monitor the performance of one or more elements of system 100. To illustrate these embodiments, FIG. 2 shows a block diagram of an exemplary closed loop system 200 consistent with embodiments of the present invention. As shown, system 200 includes a control system 210, a component 220 and a sub-component 230 that includes a sensor 235. Control system 210, component 220, sub-component 230, and sensor 235 may be configured as, and operate similar to, control system 110, components 120-1 to 120-N, sub-component 130-1 to 130-N, and sensors 135-1 to 135-N, respectively, described in connection with FIG. 1.

In one embodiment, and for exemplary purposes only, control system 210 represents a work machine control unit that is configured to send and receive data and commands to and from an on-board data link 205. Further, component 220 may include a motor control unit 222 and motor 224 that drive a shaft 225. Power produced by motor 224 is transferred to sub-component 230 via shaft 225. In this example, sub-component 230 may represent a pump that produces pressure for pumping fluid (e.g., coolant, oil, air, etc.) through a transfer system (not shown), such as a fluid or air transfer system. Sensor 235 may represent a pressure sensor that monitors and determines the pressure produced by sub-component 230 and sends a sensor signal 240 to control system 210 reflecting the determined pressure. The exemplary aspects described above with respect to system 200 are not intended to be limiting. Methods and systems consistent with embodiments of the present invention may be applied to various types of systems and components. For example, sub-component 230 may include a propeller system that produces air flow for another sub-component of a work machine. In this example, sensor 235 may monitor temperature values of a mechanism or space surrounding a mechanism. Alternatively, sensor 235 may monitor types of gases (e.g., emission gases) and provide corresponding data values associated with levels of these gases as sensor signal 240. Accordingly, in the immediately preceding example, sub-component 230 may be a system that produces these gases based on operation of component 220.

Figure 3:
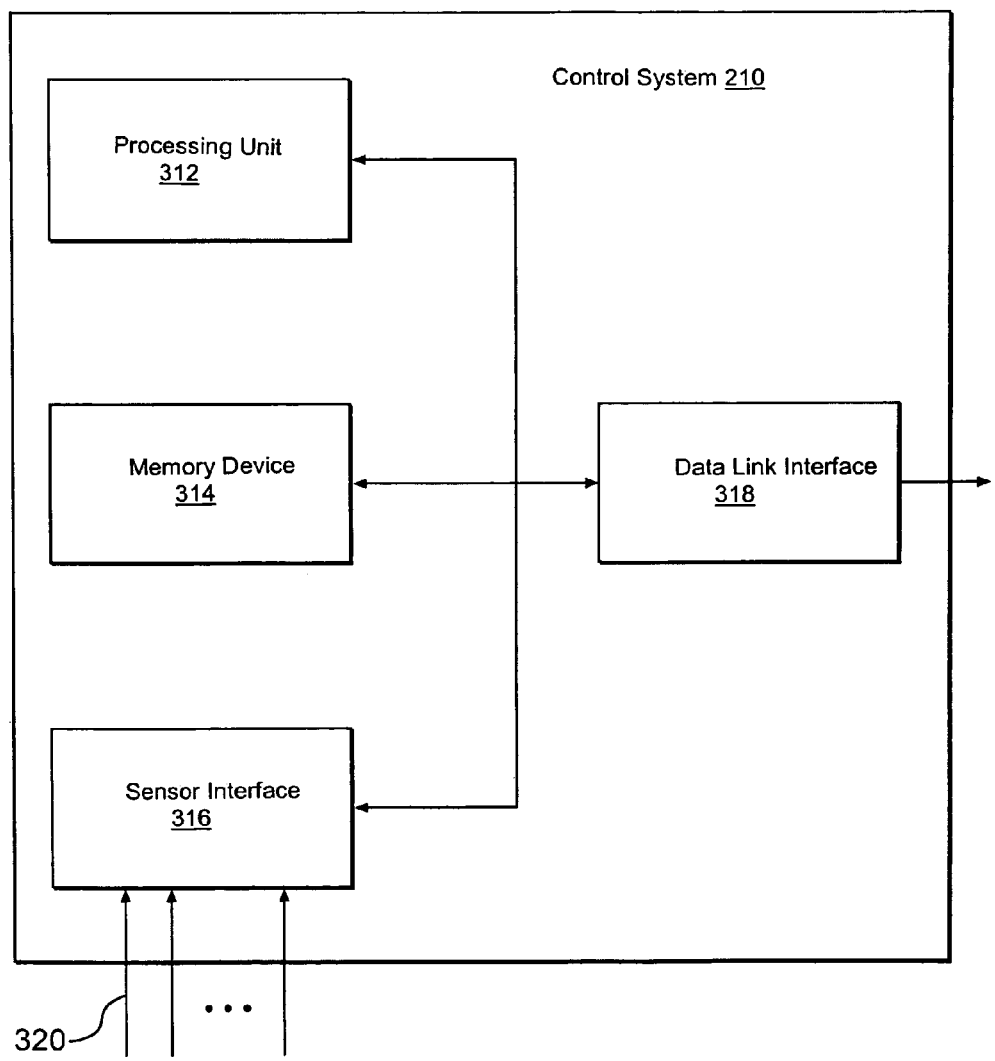
FIG. 3 illustrates a block diagram of an exemplary control system consistent with embodiments of the present invention.

In certain embodiments, control system 210 is configured to perform standard control unit functions for a work machine. Additionally, control system 210 may be configured to initiate and perform one or more diagnostic processes consistent with certain embodiments of the present invention. FIG. 3 shows a exemplary control system 210 according to these embodiments. As shown, control system 210 may include a processing unit 312, a memory device 314, a sensor interface 316, and a data link interface 318.

Processing unit 312 may represent one or more logic and/or processing components used by control system 210 to perform certain communications, control, and health test functionalities. For example, processor unit 312 may be configured for routing information among devices within and/or external to control system 210. Further, processing unit 312 may be configured to execute executing instructions from a storage device, such as memory 314. Although FIG. 3 illustrates a single processor unit, control system 210 may include a plurality of processor units, such as one or more general purpose processing units and/or special purpose processor units (e.g., ASICS). Processing unit 312 may also include, for example, one or more of the following: a co-processor, memory, registers, and other processing devices and systems as appropriate.

In certain embodiments, the functionality of processing unit 312 may be embodied within an integrated microprocessor or microcontroller. Such a microcontroller may, for example, include an integrated CPU, memory, and one or more peripherals. Depending on the implementation, control system 210 may include one or more microcontrollers in addition to or in place of processing unit 312 and memory 314, such as the Microchip's PIC, the 8051, Intel's 80196, and Motorola's 68HCxx series microcontrollers.

Memory 314 may represent one or more systems and/or mechanisms capable of storing information. Memory 314 may be embodied with a variety of components and/or subsystems, including a RAM (random access memory), a ROM (read-only memory), magnetic and optical storage elements, organic storage elements, audio disks, and video disks. In certain embodiments, memory 314 may include one or more programmable, erasable and/or re-useable storage components, such as EPROM (erasable programmable read-only memory) and EEPROM (erasable programmable read-only memory). Memory 314 may also include constantly-powered nonvolatile memory operable to be erased and programmed in blocks, such as flash memory (i.e., flash RAM). Memory 314 may provide a primary memory for processor 312, such as for storing program code. For example, memory 314 may include program code for communications, kernel and device drivers, configuration information, and other applications that might be embedded within control system 210. Although a single memory is shown, any number of memory devices may be included in control system 210, and each may be configured for performing distinct functions.

Sensor interface 316 may be an optional device that is configured to receive one or more sensor signals 320 from one or more respective sensor devices that are associated with one or more corresponding sub-components (e.g., sub-component 230). In one embodiment, control system 210 extracts the signals received at sensor interface 316 and provides them to processing unit 312 and/or memory 314 for subsequent processing. Alternatively, control system 210 may receive sensor signals 320 over a data link (e.g., data link 205) and data link interface 318.

Data link interface 318 may represent one or more interface devices that interconnect one or more data links (e.g., data link 205) with control system 210. Data link interface 318 may connect to proprietary and non-proprietary data links. In one embodiment, data link interface 318 may include virtual (i.e., software-based) ports that allow a single connection to act as if there were multiple connections.

Figure 4:
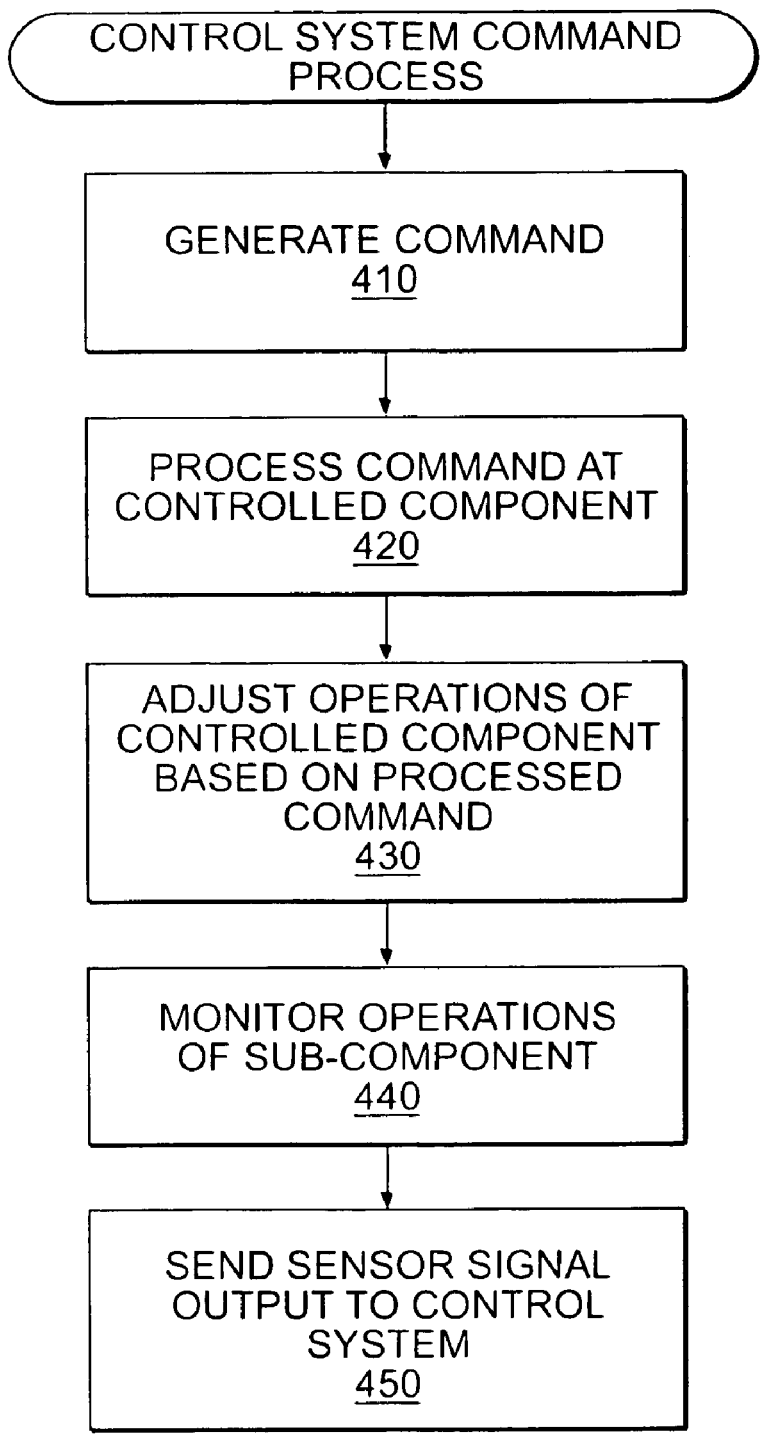
FIG. 4 illustrates a flowchart of an exemplary control system command process consistent with embodiments of the present invention.

As mentioned, methods and system consistent with embodiments of the present invention enable control system 210 to perform work machine control operations and diagnostic processes. FIG. 4 illustrates a flowchart of an exemplary control system command process that may be performed by control system 210 and other elements of system 200. During operation of the work machine in which system 200 is embedded, control system 210 may generate a command for controlling component 220, such as a parameter command to increase the speed or torque of motor 224 (Step 410). Control system 210 may generate the command based on data and/or instructions received from data link 205.

The command may be a single component signal such as a DC voltage potential, for example. In other embodiments, the command may include two or more components. For example, a first component of the command may correspond directly to a desired speed or torque of motor 224 (e.g., a DC component whose voltage level dictates the operating speed or torque of motor 224). The command may also include another component. In certain embodiments, this additional component may include a time-varying signal that is superimposed on the first component of the command. For instance, the time-varying signal may be a sinusoidal signal or any other repeating signal. The magnitude of the time-varying component may be any arbitrary value, but in certain embodiments may be limited to no more than about 15% of the magnitude of the first component of the command. Similarly, the frequency of the time-varying component may be arbitrarily chosen. In certain embodiments, however, the frequency of the time-varying component may be between about 0.01 Hz and about 1.0 Hz.

Once the command is generated, control system 210 may send the command to component 220 over data link 205. Control system 210 may send the command based on software executed by processing unit 312, based on an event detected by control system 210, and/or based on instructions received by an external element (not shown) over data link 205, such as an operator command to increase engine speed, etc.

In one embodiment of the present invention, control system 210 executes a diagnostic program stored in memory 314 that periodically generates a command to adjust one or more parameters associated with one or more respective operations of component 220. For example, processing unit 312 may execute a diagnostic program that periodically generates a command to adjust the speed of motor 224 (e.g., every minute, five minutes, every hour, etc.). Processing unit 312 produces the command and sends it to component 220 through interface 318 and data link 205.

Once sent, control component 220 may receive and process the command from data link 205 (Step 420). Processing the command may involve receiving the command at control unit 222 to determine the type of request included in the command. For instance, if the command was to increase the speed of motor 224, control unit 222 may interpret this command and generate an appropriate motor control signal to adjust the operation of motor 224 according to the processed command (Step 430). Accordingly, motor 224 may increase its speed (e.g., rpm) in response to the received control signal from control unit 222. Motor 224 may also respond to the time-varying component that may be superimposed on the first component of the command. For example, if the command was for an increase in speed to an rpm value of 100 rpm, then control unit 222 would cause an increase in speed of motor 224 to 100 rpm. If the command also included the time-varying component, as discussed above, then the control unit 222 would pass along this information to motor 224, as well. That is, assuming the magnitude of the time-varying component was about 10% of the magnitude of the first component of the command, then the time-varying component may cause a time-varying, ten-rpm response in the speed of motor 224. Thus, the speed of motor 224 may cycle between 100 rpm and 110 rpm at the frequency of the time-varying component (e.g., about 0.01 Hz to about 1.0 Hz).

In response to the adjustments to the operations of component 220 (e.g., increased speed of motor 224), sub-component 230 may change operational states. That is, sub-component 230 may adjust its operations, thus causing one or more parameters associated with the operational characteristics of sub-component 230 to change from a first state or value to another. For example, assuming sub-component 230 is a pump that produces pressure for pumping fluid to another device within the work machine, the change in the rotational speed of shaft 225 due to the corresponding change in speed of motor 224 may cause sub-component 230 to adjust the pressure provided to the other work machine device. In some instances, an increase in the speed of motor 224 may cause the fluid pump in sub-component 230 to increase the amount of pressure (e.g., psi) produced by the pump. Alternatively, a decrease in motor speed may cause the pump in sub-component 230 to decrease the pressure produced by the pump.

It should be noted that when the command includes a time-varying component, the operation of sub-component 230 may respond to the time-varying component. For instance, if sub-component 230 is a pump, as described above, the time-varying change in the rotational speed of shaft 225 due to the time-varying change in the speed of motor 224 may cause a corresponding cyclical increase and decrease in the fluid pressure supplied by the pump. The rate of the cyclical increase and decrease may occur at the same frequency of the time-varying component of the command, and the amount of increase and decrease may be associated with the magnitude of the time-varying component of the command.

During operation of sub-component 230, and thus concurrently with the above-induced changes, sensor 235 may monitor and collect information associated with the parameters or characteristics (e.g., pressure, temperature, etc.) of sub-component 230 (Step 440). In one embodiment, sensor 235 may produce and send a sensor signal 240 representing the measured characteristics to control system 210 periodically or in real time (Step 450) (e.g., psi data, temperature data, etc.). Alternatively, control system 210 may include software that provides a request to logic included in sensor 235 for a sensor signal. In response to the received request, sensor 235 may measure and collect parameter or characteristic information for sub-component 230, and send a corresponding sensor signal reflecting the collected information to control system 210.

As can be appreciated, the control system command process described above in connection with FIG. 4 shows a closed loop process where commands from control system 210 ultimately result in sensor 235 providing signals reflecting one or more parameter data values of the sub-component depending on the type of sub-component 230. In an exemplary embodiment, sensor 235 provides signals that reflect the time-varying response of, for example, motor 224 in response to the time-varying component of the command signal.

Figure 5:
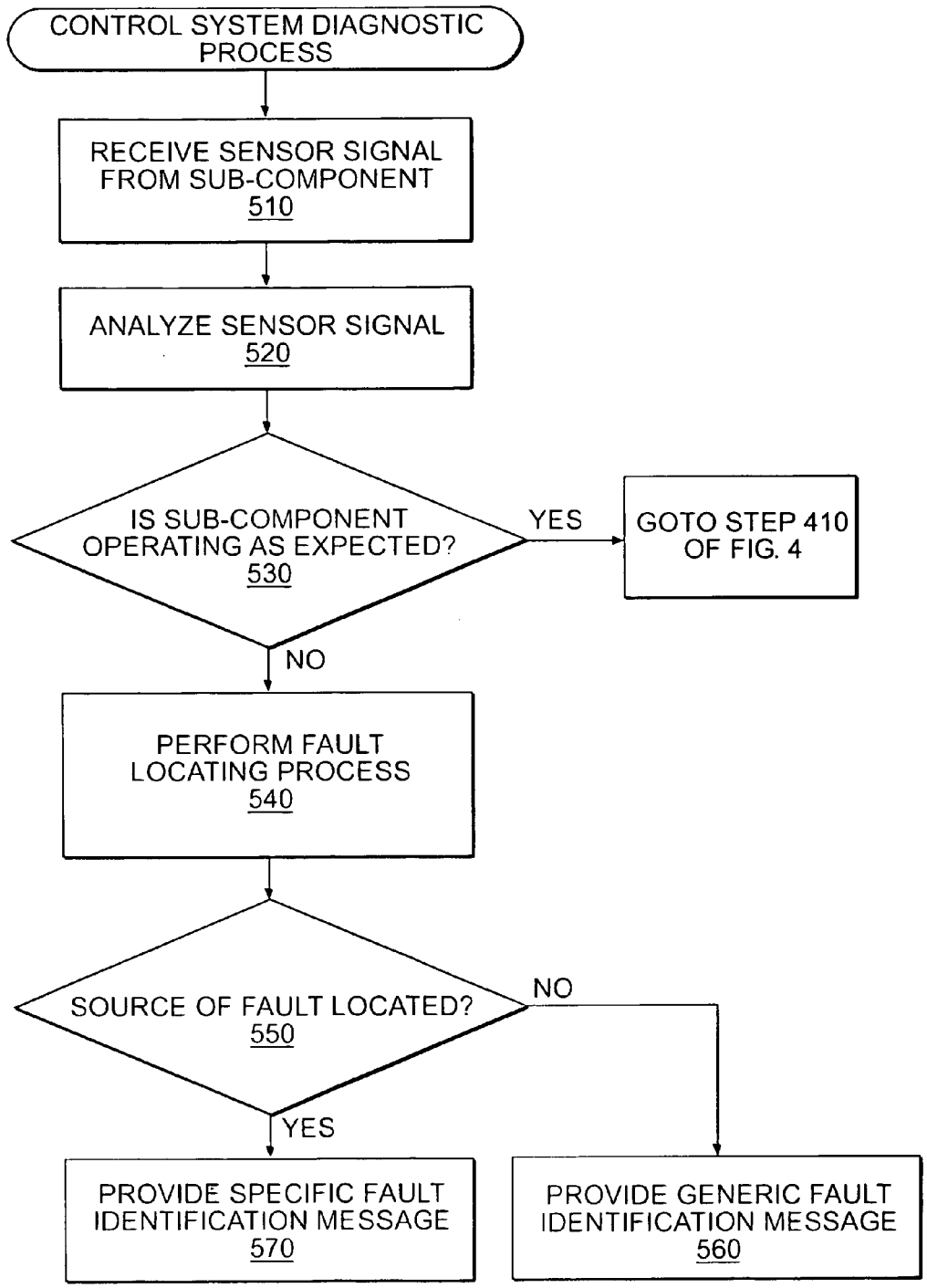
FIG. 5 illustrates a flowchart of an exemplary control system diagnostic process consistent with embodiments of the present invention.

Using this closed loop process, methods and systems consistent with certain embodiments enable control system 210 to perform testing and/or diagnostics of one or more of the elements of system 200 during operation of the work machine. FIG. 5 shows a flowchart of an exemplary control system diagnostic process that may be performed by control system 210 consistent with embodiments of the present invention. The diagnostic process may be a sub-process of a test process performed by controls system 210 that generates the commands provided to component 220. Alternatively, or additionally, the diagnostic process may be a separate program (e.g., software program) that is executed by control system 210 based on an event, such as the reception of one or more sensor signals 240 from sensor 235.

With reference to FIG. 5, control system 210 may receive one or more sensor signals 240 from sensor 235 reflecting the operation characteristics of sub-component 230 (Step 510). Following the above fluid pump example, sensor 235 may provide a sensor signal 240 reflecting the psi produced by sub-component 230 at the time when sensor 235 generates the sensor signal. Upon receipt of the sensor signal 240, sensor interface 316 may translate the characteristic information into a format compatible for use by processing unit 312. Alternatively, sensor interface 316 may forward the signal to processing unit 312 and/or memory 314 for translation. For instance, sensor interface 316 may send the sensor signal data to a memory location (e.g., address location in memory 314) that is accessed and analyzed by the diagnostic process performed by processing unit 312 (Step 520).

The sensor signal may be analyzed by control system 210 to determine whether sub-component 230 is operating as expected (i.e., according to predetermined parameters, i.e., acceptable levels) (Step 530). In one embodiment, analysis of the received sensor signal 240 may include processing unit 312 determining, via executed software, whether the parameter values associated with one or more operations of sub-component 230 have changed in an expected manner based on the command provided to component 220 in Step 410 of FIG. 4. For example, processing unit 312 may determine whether the pressure provided by sub-component 230 has increased when the command provided by control system 210 instructed control unit 222 to increase the speed of motor 224. Alternatively, or additionally, processing unit 312 may determine whether the pressure provided by sub-component 230 changed by a predetermined range based on the type of command provided by control system 210 (e.g., increase in pressure by at least 10 psi, decrease in pressure by at least 10 psi, etc.). In an embodiment where the command includes a time-varying component, processing unit 312 may determine whether the pressure (or other measurable characteristic) provided by sub-component 230 is responsive to the frequency and magnitude of the time-varying component of the command (e.g., whether the pressure varies at a rate and magnitude as expected based on the known characteristics of the command signal).

The relationship between the operations of component 220 and sub-component 230 may be directly or indirectly proportional. That is an increase in the speed of motor 224 may cause a parameter value of sub-component 230 to increase or decrease if sub-component is operating as expected.

In one embodiment of the invention, processing unit 312 may access a data structure stored in memory 314 that includes a map reflecting acceptable relationships between different types of parameters of component 220 and characteristics of sub-component 230. For example, the map may include relationships that show pressure values (e.g., psi values) that should be produced by sub-component 230 when motor 224 is running at a corresponding speed (e.g., rpm). Alternatively, or additionally, the map may include expected ranges of values for the parameter values of sub-component 230 in relation to parameter values of component 220. For instance, control system 210 may store a map in memory 312 that includes a relationship showing that sub-component 230 should produce about 100 psi (e.g., plus or minus a range factor) when motor 224 is running at speeds between 100 and 110 rpm. The above examples are not intended to be limiting and other techniques may be employed and/or executed by control system 210 to determine whether sub-component 230 is operating at an acceptable level (i.e., according to predetermined or expected specifications).

Referring back to FIG. 5, if control system 210 determines that sub-component 230 is operating according to expected specifications (Step 530; YES), the diagnostic process may return to the beginning of the control system command process shown in FIG. 4 (e.g., Step 410). On the other hand, if control system 210 determines that sub-component is not operating as expected (Step 530; NO), system 210 may perform a fault locating process (described below in connection with FIG. 6) to ascertain the source or potential source of the deviation in acceptable operation of sub-component 230 (Step 540). Based on the results of the fault locating process, control system 210 determines whether the source, or potential source, of the fault (i.e., mechanical, software, firmware, etc.) has been identified (Step 550). If not (Step 550; NO), control system 210 may generate a generic fault identification message (Step 560). This type of message may include general information identifying the elements and sub-elements thereof related to the unacceptable operations determined in Step 530, such as sub-component 230, component 220, and/or control system 210. For example, the generic fault identification message may include a list of all of the elements of system 200, or its corresponding work machine, and/or information identifying the type of abnormal operation determined by control system 210, such as insufficient fluid pressure, excessive temperature values, etc. In one embodiment, control system 210 may provide the message to another device within the work machine. For instance, control system 210 may send the generic fault identification message to an operator display device that produces a message for an operator (e.g., voice message, text message, graphical message, etc.). Alternatively, or in addition to, control system 210 may provide the generic fault identification message to another control system or similar element within the work machine for further analysis, storage, or routing to other on-board or off-board work machine elements.

On the other hand, if the fault locating process does identify the source or potential source of the abnormal operation of sub-component 230 (Step 550; YES), control system 210 may generate a specific fault identification message that identifies particular elements or sub-elements within system 200 that is the source or potential source of the abnormal operation of sub-component 230 (Step 570). In one embodiment, the specific fault identification message may include information associated with the particular component, sub-component, device, mechanism, accessory, etc, that may be the cause of the sub-component's deviation from expected operating conditions. Further, the specific fault identification message may include parameter and/or characteristic values associated with one or more of the elements in system 200 contributing to the abnormal operation of sub-component 230. Control system 210 may provide the specific fault identification message to another element within the work machine. For instance, control system 210 may send the fault identification message to an operator display device that produces a message for an operator (e.g., voice message, text message, graphical message, etc.). Alternatively, or in addition to, control system 210 may provide the fault identification message to another control system or similar device within the work machine for further analysis, storage, or routing to other on-board or off-board work machine systems.

The information included in the specific and generic fault identification messages are not limited to that described above. Control system 210 may include additional or fewer information in these messages. Further, control system 210 may refrain from sending the messages to a work machine device. Instead, system 210 may be configured to store the generated messages in memory 314 for access by processing unit 312 or other work machine devices through interface unit 318.

Figure 6:
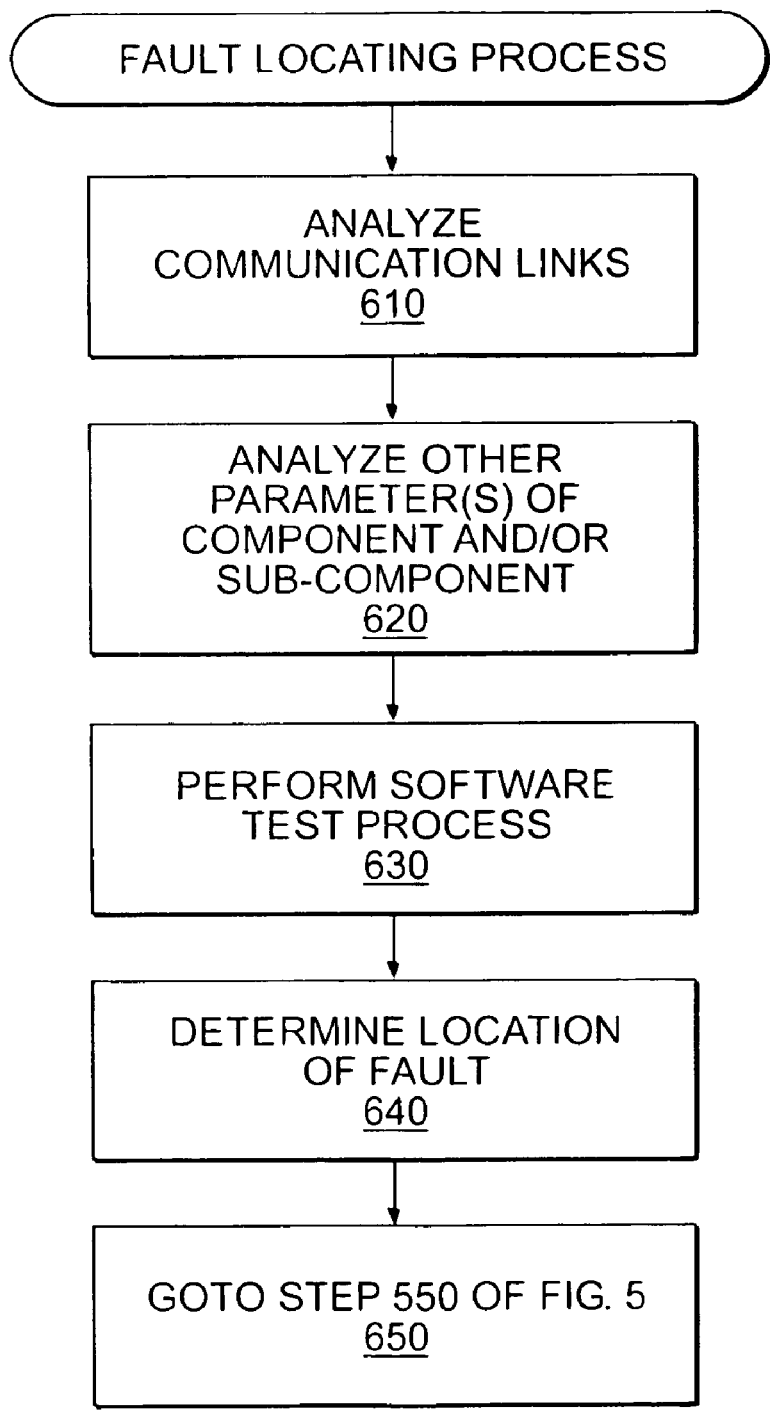
FIG. 6 illustrates a flowchart of an exemplary fault locating process consistent with embodiments of the present invention.

As explained, control system 210 may perform a fault locating process to identify, or attempt to identify, the source or potential source of the abnormal operation of sub-component 230 detected in Step 530 of FIG. 5. FIG. 6 is a flowchart of an exemplary fault locating process consistent with embodiments of the present invention. In one embodiment, when control system 210 determines that sub-component 230 is not operating at an acceptable level (FIG. 5, Step 530; NO), control system 210 may analyze the communication links between control system 210 and the elements in system 200 (Step 610). To perform this type of diagnosis, control system 210 may send a test communication message and/or signal to one or more of the elements in system 200. For example, control system 210 may send a message to component 220 over data link 205 and monitor the data link for a corresponding response message. If no response message is received from component 220 within a predetermined amount of time, control system 210 may identify data link 205 and/or component 220 as a source of the problem with sub-component 230. In one embodiment, control system 210 may eliminate one or more potential sources by using redundant data links 205 and sending the test message over one or both of the data links. If control system 210 fails to receive a response message from component 220, software code within control system 210 may determine that the data link 205 is a potential source of problem for sub-component 230 because component 220 may not be receiving the commands from system 210.

Further, control system 210 may analyze the communication paths connecting other elements of system 200 to control system 210, such as sub-component 230, sensor 235, and any other devices in system 200 that may include sensors or the like that provide information to control system 210. For example, a sensor system (not shown) may be associated with shaft 225 to monitor its operation. Also, a sensor or system may be attached to component 220, or devices therein (e.g., motor 224, control unit 222) that provides characteristic information to control system 210 over a dedicated communication path. Control system 210 may be configured to test all or some of these communication paths using send/acknowledge type test protocols.

Also, control system 210 may analyze other parameters and/or characteristics of one or more elements of system 200 (Step 620). To do so, control system 620 may collect sensor information from elements in system 200 other than that received from sensor 235. For example, control system 210 may request, or receive, sensor signals from a sensor attached to shaft 225, motor 224, etc. Also, sub-component 230 may include multiple sensors (not shown) that measure characteristics different from sensor 235. Control system 210 may collect this information and execute an analysis program stored in memory 314 to determine possible sources for the unacceptable values provided by sensor 235.

Further, control system 210 may perform one or more software test processes to analyze the functionality of any software that is operating in system 200 (Step 630). For example system 210 may perform self-test processes that provide test sensor values for analysis by a sensor analysis program executed by processor 312. If expected results are not produced by processor 312, control system 312 may determine that some program code may be defective. Also, control system 210 may send test instructions to program code executed by other elements in system 200. These instructions may request a target element (e.g., component 220) to perform its corresponding operation using data values provided by control system 210 and produce a corresponding result. Control system 210 may be configured to check the results using predetermined values stored in a data structure within memory 314 (e.g., parameter map). Alternatively, the test instructions may instruct the target element to perform its own self-test process and provide a message indicating the results to control system 210 (e.g., pass or fail).

The sequence and types of analysis processes described above is not intended to be limiting. Methods and systems consistent with embodiments of the present invention enable control system 210 to analyze and test multiple elements of system 200 in any sequence without affecting the system's ability to potentially ascertain the source or potential source of the abnormal operation of sub-component 230.

Once control system has completed one or more analysis and test process, it may execute a program to determine a possible source of a fault (i.e., cause of the abnormal values provided by sensor 235) (Step 640). To do so, processing unit 312 may execute a diagnostic routine that analyzes all of the information collected from the analysis processes performed in Steps 610–630 (and any additional processes) to identify the potential source of the fault. For example, if Step 620 produces information that reflects a situation where motor 224 and shaft 225 are rotating at acceptable speeds and the temperature or pressure measured by sensor 235 is not at an acceptable level, control system 210 may conclude that a mechanism attached to the shaft has failed (e.g., propeller). Alternatively, if a software test process performed at Step 630 produces a result that one or more software programs are not performing as expected, control system 210 may identify these programs, or the hardware associated with their execution, as a potential source of the abnormal values received from sensor 235.

Once one or more potential sources of the abnormal operation of sub-component 230 (or the abnormal values provided by sensor 235) are identified, control system 210 may provide data reflecting the potential source(s) to the fault message generating processes described in connection with Step 560 of FIG. 5. Additionally, if control system 210 does not determine a potential source of the abnormal operation of sub-component 230, system 210 may generate and send data reflecting this result to the fault generating processes in Step 560 of FIG. 5.

INDUSTRIAL APPLICABILITY

Methods and systems consistent with embodiments of the present invention allow a work machine to perform diagnosis processes that test the operation of one or more components and sub-components in the machine. In one embodiment, a control system (e.g., 210) may periodically send one or more commands to a component (e.g., 220) whose operations control the operation of one or more sub-components. Based on the received commands, the component (e.g., 220) may adjust its operations. Following the transmission of the commands, the control system (e.g., 210) analyzes sensor signals received from a sensor (e.g., 235) that collects characteristic data of a sub-component controlled by the component (e.g., 220). Based on the analysis, the control system (e.g., 210) may determine whether the sub-component (e.g., 230) is operating according to predetermined operating parameters associated with the commands sent by the control system. If the sub-component (e.g., 230) is operating abnormally, the control system (e.g., 210) may perform a fault locating process to identify potential sources or causes of the abnormal operation.

In one embodiment, control system 110 may send commands to multiple components (e.g., 120-1 to 120-N) to concurrently perform diagnostic processes for these components. Accordingly, control system 110 may be configured to multi-task the diagnosis of the operations of multiple systems (e.g., 200) that operate within a work machine. Alternatively, control system 110 may be configured to test multiple systems sequentially. For example, in one embodiment, control system 110 may send command signals to 120-1 to 120-N in sequential order. System 110 may diagnose signals from sensors 130-1 to 135-N in the order responses from these sensors are received. Alternatively, control system 110 may analyze sensor signal outputs in the order the command signals are sent (e.g., analyze sensor 135-1, then sensor 135-2, and so on).

In another embodiment, control system 210 may be configured to send a broadcast message to multiple components 120-1 to 120-N over data link 105. This embodiment may be applicable where the multiple components 120-1 to 120-N are of similar types (e.g., motor drive systems that have similar operating specifics, such as multiple fluid pump systems, etc.).

In yet another embodiment, the processes performed by the control system 210 consistent with certain aspects related to the present invention may be embedded within a component (e.g., 220). Accordingly, component 220 may initiate the periodic testing of a sub-component 230. For example, control unit 222 may execute a test process that periodically produces control signals to adjust the operation of motor 224. Further, component 220 may be configured to receive the signal produced by sensor 235. Based on the received signal, control unit 222 may perform a diagnostic process similar to that described in connection with FIGS. 5 and 6. In such an embodiment, component 220 may perform fault locating processes that analyze communication paths, sensors, and hardware and software elements associated with its operation and that of sub-component 230. Based on the results of its analysis, control unit 222 may generate a fault message in a manner similar to that performed with respect to Step 570 of FIG. 5. Alternatively, control unit 222 may provide the results of its diagnosis processes to control system 210 for further analysis and/or generation of a fault message. Additionally, control system 210 may use the results of the diagnostics performed by control unit 222 to initiate its own diagnostic process. The results of this process may be compared by control system 210 to the results provided by control unit 222 to provide a redundant test process to decrease fault reporting errors.

In another embodiment, along the same lines as the exemplary embodiment described in the previous paragraph, when control unit 222 adjusts the operation of motor 224, it may send a message to control unit 220 over data link 205 indicating that a test process is in progress. Based on this message, control system 210 may collect any subsequently received signals from sensor 235 and perform the diagnostic process explained above with respect to FIGS. 5 and 6. Alternatively, control system 210 may be configured to wait a predetermined period of time after receiving the test in progress message from control unit 222 before beginning the diagnostic process.

The use of a multi-component command signal may have notable benefits. For example, to gain more information about the operation of a system, the response of the system may be observed with respect to each of the components of the command. For example, if a DC component of a command corresponds to an expected motor speed of 100 rpm, then the speed of the motor may be monitored after issuing the command to determine whether the motor is, indeed, operating at the expected rate. This information, however, may not indicate whether or not the sensor is operating properly. In order to gain more information about the system, including whether the appropriate sensors are functioning properly, a time-varying component of the command may be superimposed on the DC component of the command. In response to the time-varying component, the motor speed, for example, would be expected to exhibit a corresponding variation over time. If such a time-varying response is measured, then this information would confirm that both the motor and the sensor are functioning as expected.

The frequency of the time-varying component of the command may be arbitrarily selected. In certain embodiments, however, the frequency may be chosen according to the response time of the system to be monitored. A frequency slower than the response time, for example, would be appropriate for accurately observing a system response. Similarly, the magnitude of the time-varying component of the command may be arbitrarily selected. In certain embodiments, however, the magnitude may be selected so as not to detrimentally affect the operation of the system being measured (e.g., it would be undesirable to have a pressure relief valve or other corrective system respond to the fluctuations in the system being measured).

The embodiments, features, aspects, and principles of the present invention may be implemented in various environments and are not limited to work site environments. For example, a work machine with an embedded gateway may perform the functions described herein in other environments, such as mobile environments between job sites, geographical locations, and settings. Further, the processes disclosed herein are not inherently related to any particular system and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A method for testing multiple elements of a work machine, including a control system, a component, a sub-component that is influenced by operations of the component, and a sensor that monitors a characteristic of the sub-component, the method performed by the control system comprising:
   sending a command to the component to adjust a first parameter associated with an operation of the component;
   detecting a sensor signal from the sensor reflecting a second parameter associated with a characteristic of the sub-component;
   determining whether the second parameter is acceptable based on the command; and
   diagnosing at least one of the elements of the work machine when the second parameter of the sub-component is not acceptable.

2. The method of claim 1, wherein the component adjusts the first parameter based on the received command and the sub-component operates in a manner that changes the second parameter from a first value to a second value based on the adjustment of the first parameter.

3. The method of claim 2, wherein determining further includes:
   determining whether the second value of the second parameter matches an expected value based on the command sent to the component.

4. The method of claim 2, wherein determining includes:
   determining whether the second value of the second parameter is within a predetermined range of an expected value based on the command sent to the first component.

5. The method of claim 4, further including:
   determining that the second parameter is unacceptable when the second value is not within the predetermined range of an expected value.

6. The method of claim 4, wherein diagnosing at least one of the elements of the work machine includes at least one of:
   performing a communication test between the control system and another element of the work machine;
   collecting first status information associated with the component;
   collecting second status information associated with the sensor; and
   collecting third status information from the sub-component.

7. The method of claim 6, wherein diagnosing at least one of the elements of the work machine further includes:
   identifying which of the elements may be associated with the second parameter being unacceptable based on the diagnosing.

8. The method of claim 6, wherein the first status information includes the first parameter.

9. The method of claim 6, wherein the first status information includes a parameter that is different from the first parameter.

10. The method of claim 6, wherein collecting third status information includes:
    collecting a third parameter associated with a second characteristic of the sub-component.

11. The method of claim 1, wherein the command includes a first portion and a second portion superimposed on the first portion.

12. The method of claim 11, wherein the second portion is a time-varying portion.

13. The method of claim 12, wherein the second portion has a frequency of between about 0.01 Hz and about 1.0 Hz.

14. The method of claim 12, wherein determining includes:
    determining whether the second parameter is responsive to the time-varying portion.

15. The method of claim 11, wherein the second portion has a magnitude less than about 15% of a magnitude of the first portion.

16. The method of claim 1, further including:
generating a fault message based on the diagnosis of the at least one of the elements of the work machine.

17. The method of claim 16, further including:
sending the fault message to an element included in the work machine.

18. The method of claim 16, further including:
sending the fault message to an element external to the work machine.

19. The method of claim 16, wherein the fault message includes an identification of an element determined to be a possible cause of the second parameter being unacceptable.

20. The method of claim 1, wherein the component includes a motor that provides power to the sub-component.

21. The method of claim 1, wherein the sub-component is a pump system that receives power from the component.

22. The method of claim 1, wherein diagnosing at least one of the elements of the work machine includes:
performing a software test on one or more programs executed by at least one of the control system and the component.

23. The method of claim 1, wherein diagnosing at least one of the elements of the work machine includes:
diagnosing an element different from the component, sub-component, sensor, and control system; and
determining whether the different element is affiliated with the second parameter of the sub-component being unacceptable.

24. The method of claim 1, wherein sending a command includes:
periodically sending the command to the component.

25. The method of claim 1, wherein the control system is configured to provide the command on a data link of the work machine and evaluate an operation of at least one element in the work machine based on the command, the component is configured to perform a first operation for the work machine, receive the command, and adjust a first parameter associated with the first operation based on the command, and the sub-component is configured to perform a second operation for the work machine and adjust a second parameter associated with the second operation based on the first operation of the component, and wherein the control system uses the sensor signal to determine whether the second operation is being performed at an acceptable level.

26. A computer-readable medium including instructions for performing a method, when executed by a processing unit, for diagnosing one or more elements of a work machine, the method comprising:

sending a command to the component to adjust a first parameter associated with an operation of the component;
detecting a sensor signal from the sensor reflecting a second parameter associated with a characteristic of the sub-component;
determining whether the second parameter is acceptable based on the command; and
diagnosing at least one of the elements of the work machine when the second parameter of the sub-component is not acceptable.

27. The computer-readable medium of claim 26, wherein the command includes a first portion and a time-varying second portion superimposed on the first portion.

28. The computer-readable medium of claim 26, further including determining whether the second parameter is responsive to the time-varying second portion.

29. An apparatus for diagnosing one or more elements of a work machine, comprising:
a processing unit; and
a memory including:
program code for performing a diagnosis process including the steps of:
periodically sending commands to a component that adjusts the operation of the component, wherein at least one of the commands includes a first portion and a time-varying second portion superimposed on the first portion,
receiving a sensor signal from a sensor monitoring a characteristic of a sub-component that operates in a manner based on the operation of the component,
determining whether the characteristic of the sub-component is acceptable in relation to the operation of the component adjusted by the command,
determining whether the characteristic is responsive to the time-varying second portion,
diagnosing the one or more elements of the work machine when the characteristic of the sub-component is unacceptable, and
determining whether any one of the one or more elements is a cause of the characteristic being unacceptable,
wherein the one or more elements includes at least the component and sub-component.

* * * * *